Patented Apr. 22, 1952

2,593,563

UNITED STATES PATENT OFFICE 2,593,563

PHLOROGLUCINOL DERIVATIVES

Max N. Huffman, Dallas, Tex.

No Drawing. Application May 2, 1949,
Serial No. 91,015

1 Claim. (Cl. 260—613)

This invention relates to new chemical compounds and more particularly to new derivatives of phloroglucinol.

Phloroglucinol, having the structural formula

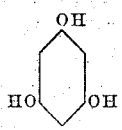

and some of its derivatives, are known, but they have had no particular interest as germicides. The present invention involves the discovery that certain new derivatives of phloroglucinol have unexpected utility as germicides for antiseptic and therapeutic use.

The compounds of the invention can be represented by the structural formula:

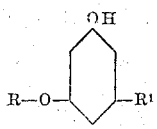

In this formula R is a radical containing from four to sixteen carbon atoms, at least one of which is an aliphatic carbon atom connected through the ether linkage to the benzene nucleus. If R is alkyl, it can be a straight chain, or a secondary or an iso radical. It has been found that the greatest germicidal activity is present if the alkyl group is from four to six carbon atoms long.

The alkyl group constituting the radical R can contain reactive groups such as hydroxyl, carboxyl and halogen components. For example, it can be carboxymethyl, glyceride, or chloroalkyl. Or, to the radical R may be attached a cyclic group, either directly to or through an ether linkage, so that R, for example, is benzyl or phenoxyethyl. R may, as well, be alkoxy-alkyl such as ethoxyethyl.

In general terms therefore, the substituent at the 5-carbon of the phloroglucinol nucleus is connected through its ether linkage to the benzene ring. The R of this substituent can be alkyl or aralkyl, so long as an aliphatic carbon thereof is connected to this ether oxygen.

The $R^1$ in the above formula can be hydroxy, alkoxy, acyloxy, amino, —NH alkyl, or —NH acyl. If it is hydroxyl, it is apparent that the resulting compound is a mono-ether of phloroglucinol, and that if it is alkoxy, the resulting compound is a di-ether of phloroglucinol. It may be observed here that if $R^1$ is alkoxy, any of the radicals falling within the definition of R as set forth above, may constitute the alkyl portion of $R^1$.

If $R^1$ is acyloxy, the acid radical may be from an aliphatic, an aromatic, or a heterocyclic acid. Thus the resulting ester may be that of acetic acid, benzoic acid or nicotinic acid. Further, the resulting ester may be of a polybasic acid as succinic acid.

When $R^1$ is amino, the compound is a monoether of phloramine. This amino group may, as will be noted, have an alkyl or an acyl substituent. The alkyl-amines which are contemplated are principally the lower aliphatic amines, such as methyl or propyl amine.

In the instances in which $R^1$ is an amide residue, its acyl component may be aliphatic, aromatic or heterocyclic. For instance, the acyl component may be butyryl, benzoyl, or nicotinyl. Furthermore, in this respect, the acyl group may be of a sulfonic acid as sulfanilyl, succinyl, or may be guanyl.

It will therefore be seen that the invention contemplates certain ethers of phloroglucinol, an ester of phloroglucinol, or of phloramine. In the case of the ethers, both mono- and di-ethers are contemplated and in all instances an aliphatic carbon is immediately connected to the ether oxygen. In the case of ether derivatives of phloramine, this amino on the benzene nucleus may be alkyl or acyl substituted.

The monoalkyl ethers of phloroglucinol were generally prepared by dissolving the anhydrous phloroglucinol and 2 moles of the alcohol in dioxane (freshly-distilled from sodium), cooling the solution in the ice-bath, and saturating with anhydrous hydrogen chloride. Whenever the solution had been saturated with hydrogen chloride, the flask was closed with a glass stopper, allowed to stand in the ice-bath two to three hours, and then allowed to remain at room temperature in the dark for a period of one to two weeks. The dialkyl ethers were obtained in a similar fashion except that the anhydrous phloroglucinol was dissolved in a great excess of the alcohol.

After the reaction time had ended, the reaction mixture was taken up in ethyl ether or benzene, and the organic phase washed well with water. The solvent was evaporated and unreacted alcohol removed in vacuo; the resulting residue was distilled or recrystallized depending upon the particular compound. Purification was often facilitated by distillation prior to crystallization. Both mono- and di-ethers can be isolated from the reaction in which the phloroglucinol was dissolved in an excess of the alcohol. In the case of octyl and gamma-chloropropyl analogs, this was done.

In general, this condition of reactions favors the formation of di-ether. The mono-ether was separated from di-ether by reason of its solubility in potassium carbonate solution, and insolubility in petroleum ether. If this separation is not performed before distillation, a mixture of both mono- and di-ethers distils, although separation is facilitated if the residue from initial extraction is distilled prior to alkali separaton. Due to the susceptibility of the mono-ethers to air in alkaline solution, nearly all of the mono-ethers were prepared without alkali extraction. Recrystallization from aqueous alcohol and from benzene-petroleum ether was used for the mono-ethers, the di-ethers being pure after distilling twice at high vacuum. The di-ethers were generally oils at room temperature.

To obtain the mono-ethers of an ester of phloroglucinol, the mono-ether obtained as above was generaly reacted with an anhydride of the acid. Recovery of the desired product is carried out by selective extraction and evaporation.

The mono-ether obtained as above described was used to obtain the corresponding derivative of phloramine. Suitable procedure is outlined in the following examples dealing with specific compounds of this character. From other examples will be evident the derivation of compounds in which the amino radical on the benzene nucleus is alkyl or acyl substituted.

The character of the compounds of the invention and the procedures for obtaining them will be further explained by the following examples:

Example 1

*Phloroglucinol mono-n-amyl ether.* — Anhydrous phloroglucinol (75.6 g., 0.3 mole) was dissolved in a mixture of n-amyl alcohol (105.6 g., 0.6 mole) and dioxane (200 ml., which had been freshly distilled from sodium). This solution was cooled in an ice-bath and saturated with anhydrous hydrogen chloride. The reaction mixture was allowed to stand in the ice-bath for two to three hours; then, at room temperature for ten days in the dark. It was taken up in ether (3500 ml.), washed four times with water (1500 ml.) and taken to dryness, finally removing unreacted alcohol in vacuo. The residue was distilled in high vacuum at a bath temperature of 130–140° at a pressure of three to four microns as read on a Stokes version McLeod gauge. The distillate after crystallizing once from benzene and petroleum ether, was pure enough for use in subsequent reactions. Three recrystallizations from a mixture of benzene and petroleum ether give compound of melting point 86–87°. The yield was 36.2 g. (39.7%).

*Anal.*—Calc'd. for $C_{11}H_{18}O_4$: C, 61.66; H, 8.47. Found: C, 61.74, 61.60; H, 8.32, 8.42.

To further characterize the product of Example 1, it was converted to 2,6-dihydroxy-4-n-amyloxy benzoic acid. Phloroglucinol mono-n-amyl ether (2.0 gm.) was placed in a glass tube with $KHCO_3$ (16.0 gm.), and $H_2O$ (16 ml.). After the air had been flushed out by the use of a small piece of Dry Ice, the tube was sealed and then heated on the steam-bath for twenty-four hours. After having been cooled, the contents were taken up in $H_2O$ (150 ml.) and acidified with concentrated hydrochloric acid. This mixture was extracted once with ether (500 ml.) and the ether washed with $H_2O$ (350 ml.). The ether phase was then extracted three times with 3% $KHCO_3$ (350 ml. portions), and the combined bicarbonate phases acidified at once with concentrated hydrochloric acid and extracted with ether (750 ml.). This ether was washed twice with water (500 ml. portions), dried over sodium sulfate, and evaporated to give 2.1 g. (96%) of crystalline material. The crystalline residue was recrystallized four times from ether-cyclohexane to give a constant melting material. The 2,6-dihydroxy-4-n-amyloxybenzoic acid crystallizes in fine needles which decompose at 134–134.5° with evolution of gas.

The phloroglucinol mono-n-amyl ether of Example 1 may also be converted to a diacetate or similar di-ester. To obtain the diacetate, phloroglucinol mono-n-amyl ether (2 g., 0.01 mole) was dissolved in acetic anhydride (20 ml.) and heated on the steam-bath for two hours. The mixture was then cooled, diluted with $H_2O$ (80 ml.) and placed in the ice-box. The oil which separated was washed several times with water by decantation and then dried in vacuo over KOH and $H_2SO_4$. The dried oil was twice distilled in a high vacuum. The colorless diacetate distils at a bath temperature of 110° at 225 microns. The yield was 2.0 g. (71%). Using benzoyl chloride, a dibenzoate of the monoamyl ether was obtained in the form of fine needles melting at 73°.

Example 2

*Delta-chlorobutyl mono-ether of phloroglucinol.*—Anhydrous phloroglucinol (6.3 g., 0.05 mole) was dissolved in a mixture of tetrahydrofuran (7.2 g., 0.1 mole) and dioxane (20 ml., freshly distilled from sodium). After cooling in an ice-bath, the solution was saturated with anhydrous hydrogen chloride; then, allowed to stand at room temperature for one week. The reaction mixture was dissolved in benzene (1000 ml.), washed with water (750 and two 500 ml. volumes respectively). The benzene was removed by evaporation and the residue covered with petroleum ether (50 ml.). After decantation of the solvent, the residual oil was dissolved in benzene, treated with charcoal, and precipitated with petroleum ether. The compound, after several recrystallizations, melted at 77–78.5°. It crystallized in square plates as a monohydrate. The crude yield was 3.0 g. (25.6%).

*Anal.* — Calc'd. for $C_{10}H_{15}O_4Cl$: Cl, 15.11. Found: Cl, 15.16, 15.02.

Example 3

*Mono-cetyl ether of phloroglucinol.*—Anhydrous phloroglucinol (3.2 g., 0.025 mole) and cetyl alcohol (12.1 g., 0.05 mole) was dissolved in dioxane (40 ml.). Anhydrous hydrogen chloride was bubbled through the solution with occasional cooling to prevent heating and the mixture allowed to stand at room temperature for seven days. The reaction mixture was taken up in benzene (750 ml.) and washed with water (500 and 350 ml. portions respectively). The benzene was removed by evaporation, the residue dissolved in 80% methanol (400 ml.) and extracted with petroleum ether (400 and 250 ml. portions respectively). The aqueous methanol was concentrated to turbidity and placed in a refrigerator for one day. The crystals which separated were recrystallized from aqueous methanol. After four recrystallizations the yield was 700 mg. (10%) of material melting at 82–83° (crude).

*Anal.*—Calc'd. for $C_{22}H_{38}O_3$: C, 75.38; H, 10.93. Found: C, 75.24, 75.14; H, 10.74, 10.69.

Example 4

*Mono-epsilon-chloroamyl ether of phloroglucinol.*—Anhydrous phloroglucinol (6.3 g., 0.05 mole) and pentamethylene chlorohydrin (15 gm., 0.1 mole + excess) was dissolved in dioxane (20 ml., freshly distilled from sodium). The solution was cooled in an ice-bath and saturated with anhydrous hydrogen chloride. After standing in the ice-bath for two to three hours, it was allowed to stand at room temperature for seven days. The reaction mixture was taken up in benzene (1000 ml.) and washed four times with water (750 ml. portions). The benzene was evaporated and the unreacted chlorohydrin removed in vacuo. The residue was covered with petroleum ether (50 ml.) and placed in the refrigerator. Since purification by recrystallization was difficult, the 1.7 g. of material was taken up in ether and extracted with 3% potassium bicarbonate. On acidification of the carbonate layer and extraction with ether followed by two recrystallizations from a mixture of benzene and petroleum ether, the mono-ether was obtained. The yield was 0.60 g. (5%) of material melting at 61–61.5°, which would melt considerably higher on further purification.

*Anal.*—Calc'd. for $C_{11}H_{17}O_4Cl$: Cl, 14.25. Found: Cl, 14.20, 14.33.

Example 5

*Di-n-amyl-ether of phloroglucinol.*—Anhydrous phloroglucinol (10 g., 0.08 mole) was dissolved in n-amyl alcohol (100 ml.). After saturation with anhydrous hydrogen chloride with cooling in an ice-bath, the solution was allowed to stand at room temperature for seven days. The reaction mixture was taken up in benzene (500 ml.) and washed three times with water (250 ml. volumes). After evaporation of the benzene and removal of unreacted alcohol in vacuo, the di-ether was obtained by twice extracting the residue with refluxing petroleum ether (250 ml. volumes). The petroleum ether extracts were combined, washed three times with 3% potassium carbonate (250 ml. volumes). The potassium carbonate extracts were discarded and the petroleum ether extracted four times with N sodium hydroxide (250 ml. volumes). On acidification with hydrochloric acid an oil separated which was extracted with ether (750 ml. and 500 ml. portions). The ether was washed with water and removed by evaporation. The residue was distilled twice in high vacuum. The product distilled at a bath temperature of 100° at a pressure of 5–6 microns. A yield of 4.3 g. (20%) was obtained.

*Anal.*—Calc'd. for $C_{16}H_{26}O_3$: C, 72.14; H, 9.84. Found: C, 72.06, 71.98; H, 9.45, 9.53.

To further characterize the product of Example 5, the tributyl ether was prepared as follows: Phloroglucinol dibutyl ether (1.2 g., 0.005 mole) was dissolved in n-butyl chloride (5 ml.) and treated with potassium hydroxide dissolved in butanol (7 ml., of a stock solution prepared by dissolving 5.0 g. KOH in 55 ml. butanol) and the mixture refluxed over a free flame for thirty minutes. The reaction mixture was taken up in benzene (200 ml.) and washed four times with water (100 ml. portions). The benzene was taken to dryness and unreacted alcohol removed in vacuo. The residue was taken up in petroleum ether (250 ml.), washed four times with N sodium hydroxide (150 ml. portions), then with three portions of water (200 ml. each). The residue after evaporation of the petroleum ether was distilled in high vacuum. The yield was 0.8 grams of an oil distilling at a bath temperature of 105–110° at 150 microns pressure. (The unreacted dibutyl ether was quantitatively recovered.)

*Anal.*—Calc'd. for $C_{18}H_{30}O_3$: C, 73.42; H, 10.27. Found: C, 73.35, 73.45; H, 10.17, 10.25.

Example 6

*3 - n-amyloxy-5-hydroxyphenoxyacetic acid.*—Phloroglucinol monoamyl ether (4.0 g., 0.02 mole) and chloracetic acid (1.8 g., 0.02 mole) were dissolved in 30% sodium hydroxide (15 ml.) and refluxed for 1.5 hours over a micro gas flame. The mixture was acidified with concentrated hydrochloric acid while still hot, cooled and the reaction mixture taken up in ether (250 ml.). The ether was washed two times with water and then extracted twice with 3% sodium carbonate (250 ml. portions). Strong acidification of the combined carbonate layers resulted in the separation of the product as an oil. The acidified layer plus oil was extracted twice with ether and the combined ethers washed two times with $H_2O$. Evaporation of the ether yielded an oil which recrystallized from a mixture of benzene and petroleum ether. Several recrystallizations from aqueous ethanol gave 1.2 g. (24%) of colorless material melting at 139°.

Example 7

*1-n-amyloxy- 3 -hydroxy-5-methoxybenzene.*—Phloroglucinol mono-n-amyl ether (4.6 g.) was dissolved in absolute methanol (25 ml.). The solution was saturated with anhydrous hydrogen chloride while being cooled in an ice-bath. The reaction mixture was allowed to stand for nine days at room temperature and then taken up in benzene (400 ml.) and the benzene washed two times with water (250 ml. portions). The desired compound was then extracted from the benzene by shaking three times with N sodium hydroxide (250 ml. portions). Acidification of the combined alkali phases caused the separation of the product as an oil which was dissolved by twice extracting the mixture with ether (first 500 ml. then 250 ml.). The ether, after having been washed twice with water, was evaporated to give 2.5 g. of an oil. This oil, which failed to crystallize, was dissolved in a mixture of benzene (100 ml.) and petroleum ether (200 ml.) and washed two times with 3% potassium carbonate (250 ml.) to remove any unreacted monoether. The organic phase, after washing with water, was evaporated to dryness and the resulting oil dissolved in petroleum ether (50 ml.). The solution was treated with charcoal, filtered, and the filtrate evaporated to about 5 ml. After a period in the refrigerator, this solution deposited crystals. The product was twice recrystallized from a mixture of cyclohexane and petroleum ether after which it melted at 35°.

Example 8

*Phloroglucinol mono-n-amyl ether mononicotinate.*—Phloroglucinol monoamyl ether (1.9 g., dried by benzene distillation) and nicotinic anhydride (2.3 g.) was dissolved in dry benzene (25 ml.). The reaction mixture was refluxed on a steam-bath for four hours during which time it was protected from atmospheric moisture by means of a drying tube. (The reaction mixture assumed a canary yellow color.) After cooling, the reaction mixture was dissolved in ether (450 ml.) and filtered free of insoluble nicotinic acid. The ethereal filtrate was then washed four times with 3% potassium carbonate (250 ml. portions) and then washed three times with water (250 ml. portions). Evaporation of the ether yielded an oil which did not crystallize. This oil was then taken up in benzene (250 ml.) and the latter extracted three times with 6 N hydrochloric acid. Neutralization of the combined hydrochloric acid extracts with solid potassium carbonate yielded an oil which was extracted with ether (500 ml.). The ether solution was washed twice with water, dried over sodium sulfate and the ether removed by evaporation. The resulting oil upon distillation at 160–165° at 30 microns gave 2.0 g. (66%) of oily distillate.

Example 9

*1-(3-amyloxy - 5 - hydroxyphenoxy) -3-chloropropanol-2.*—This compound is easily prepared by heating together molecular proportions of phloroglucinol monoamyl ether and epichlorohydrin, since the epoxy group reacts preferentially. Phloroglucinol monoamyl ether (3.9 g.) and epichlorohydrin (1.8 g.) were heated on a steam-bath without a solvent for 7 to 8 hours. The mixture was then dissolved in ether (100 ml.) and the ether washed three times with 3% potassium carbonate and then, two times with water. After evaporation of the ether, the excess epichlorohydrin was removed at reduced pressure. The residual oil was recrystallized several times from a mixture of benzene and petroleum ether. The compound was twice recrystallized from benzene (treated with charcoal each time). The product separated in glistening plates which melted at 138–139°, the yield was 2.2 g. (31%).

From Examples 1 through 9 will be evident other examples of analogous mono- and di-ethers. Thus by selection of the corresponding alcohol and following the general procedure of Example 1 or 3, the desired ether will be obtained. By using a secondary or branched chain alcohol, the secondary or iso ether derivative will be obtained. Other di-ethers can be produced according to Example 5, and mixed di-ethers can be obtained similar to the procedure of Example 7.

By using benzoic anhydride or other aromatic anhydrides and proceeding according to Example 8, other mono-ether, mono-ester derivatives of phloroglucinol are obtainable. It will here be recognized that by first preparing the proper mono-ether as the starting compound according to the method explained above, the desired ester of this mono-ether will be obtained. Similarly, other examples of mono-esters of aliphatic acids will be evident from Example 8.

The production of mono-ether derivatives of phloramine and N-alkyl and N-acyl phloramine will be clear from the following examples. Mention may first be made, however, of the following dihydroxy, N-acyl derivatives of phloramine to show the general characteristics of phloramine.

N-(3,5-dihydroxyphenyl)-nicotinamide is prepared as follows: Phloramine (1.2 g., 0.02 mole, dried in a vacuum desiccator) was dissolved with warming in dioxane (25 ml., freshly distilled from sodium). After the amine had dissolved, nicotinic anhydride (2.3 g.) was added and the reaction mixture allowed to stand at room temperature for one day. Crystallization occurred soon after admixture of the reactants. The product was recrystallized four times from a mixture of dioxane and petroleum ether. The final yield was 2.0 g. (83.3%) of material which darkened at 195° and melted with decomposition at 197–198°. Analytical data shows the compound to be a monohydrate.

*Anal.*—Calc'd for $C_{12}H_{12}O_4N_2$: N, 11.29. Found: N, 11.15, 11.09.

N-(3,5-dihydroxyphenyl)-butyramide was prepared as follows: Dry phloramine (2.4 g., 0.02 mole) was dissolved in dioxane (40 ml., freshly distilled from sodium) by warming on a steam-bath. After all the phloramine had dissolved, butyric anhydride (3.2 g.) was added and the mixture allowed to stand at room temperature for one hour. The mixture was then cooled in ice-bath and the white solid which separated was collected by filtration and washed with cold dioxane. After recrystallizing three times from dioxane with concurrent treatment with charcoal, there remained 3.8 g. (quantitative) of glistening crystals which melted at 179°.

*Anal.*—Calc'd. for $C_{10}H_{13}O_3N$: N, 7.18. Found: N, 7.30, 7.23.

Example 10

*Phloramine monoamyl ether.*—The amination of phloroglucinol mono-amyl ether was accomplished by utilization of the Bucherer reaction. Phloroglucinol mono-amyl ether (7.8 g.), ammonium chloride (2.1 g.), 95% sodium bisulfite (4.4 g.) and 28% ammonia (100 ml.) were placed in a Monel-metal bomb. The sealed bomb was heated in an oil bath for six hours at 185°. The bomb contents were dissolved in ether (500 ml.) and then extracted with dilute hydrochloric acid (two 250 ml. portions and 100 ml. portion respectively). The combined aqueous extracts were made alkaline with solid potassium carbonate whereupon the amine separated as a crystalline solid. After cooling by addition of ice, the solid was removed by filtration and washed well with ice water. After recrystallizing three times from a mixture of benzene and petroleum ether, with attendant treatment with charcoal, there remained 5.1 g. (65.4%) of glistening leaflets which melted at 104.5°.

*Anal.*—Calc'd for $C_{11}H_{17}O_2N$: C, 67.66; H, 8.78; N, 7.17. Found: C, 67.66, 67.70; H, 8.72, 8.74; N, 7.25, 7.19.

Example 11

*N - (3 - n - amyloxy - 5 - hydroxyphenyl) - nicotinamide.* — Phloramine mono-amyl ether (1.9 g., 0.01 mole) and nicotinic anhydride (2.3 g.) were both dried in vacuum desiccator over sulfuric acid and potassium hydroxide and then dissolved in dry benzene (75 ml.). This reaction mixture was refluxed on a steam-bath for thirty minutes during which time it became a white paste. After evaporating the benzene, the residue was twice recrystallized from aqueous alcohol and finally from absolute ethanol. The yield was 28 g. (almost theoretical) of white crystals which melted at 189–189.5°.

*Anal.*—Calc'd for $C_{17}H_{20}N_2O_3$; N, 9.33. Found: N, 9.20, 9.29.

Example 12

*N - (3 - n - amyloxy - 5 hydroxyphenyl) - succinamic acid.*—Phloramine (1.95 g., 0.01 mole) and succinic anhydride (1.0 g., 0.01 mole) was dissolved in dry chloroform (35 ml.) and the resulting solution heated at reflux for fifteen minutes. A few minutes after refluxing commenced, a precipitate began to separate and eventually the whole mixture became a white paste. The reaction mixture was then cooled and placed in a refrigerator for one day.

The white precipitate was removed by filtration and washed well with cold chloroform. The solid (2.5 g.) was dissolved in ether (100 ml.) and extracted with 3% sodium bicarbonate (100 ml.). The aqueous phase was made acid to Congo red paper with acetic acid and a small amount of hydrochloric acid, whereupon crystallization took place at once. After chilling in the refrigerator, the crystals were removed by filtration and without drying dissolved in methanol. The solution was treated with charcoal, filtered, treated with water, and concentrated to supersaturation. After recrystallizing once more from aqueous methanol and twice from aqueous ethanol, the glistening plates melted at 99–100.5°. The yield was quantitative.

Anal.—Calc'd. for $C_{15}H_{21}O_5N$: N, 4.74. Found: N, 4.63, 4.68.

*Example 13*

$N^1$ - (3 - n - amyloxy - 5 - hydroxyphenyl) - sulfanilamide. — Phloramine mono-amyl ether (1.0 g., 0.005 mole) was dissolved in pyridine (3 ml.); then with swirling 4-acetylaminobenzene-sulfonyl chloride (1.2 g.) was gradually added with occasional cooling in ice-bath. After all the acid chloride was added, the reaction mixture was heated with swirling on a water-bath at 70–80° for forty-five minutes. The reaction mixture was treated with dilute hydrochloric acid until no further precipitation occurred. The oil which separated was removed by decantation and dissolved in alcohol. After treating the solution with charcoal and filtering, water was added and the resulting solution concentrated to turbidity on a steam-bath. The solid that separated on cooling in the refrigerator was recrystallized three times from aqueous ethanol. The yield of material melting at 130–131° was 1.2 g.

The above acetyl derivative (.7 g.) was dissolved in a mixture of concentrated hydrochloric acid (5 ml.), water (5 ml.), and ethanol (2 ml.) and then heated at reflux for five hours. After cooling, solid potassium carbonate was added until the solution was slightly akaline; then the mixture cooled in the refrigerator. The compound separated as an oil and then solidified. After twice recrystallizing from aqueous ethanol with attendant treatment with charcoal, colorless platelets were obtained which melted at 137–138°. The yield was 0.5 g. (49.1%).

Anal.—Calc'd. for $C_{17}H_{22}N_2O_4S$: N, 8.00; S, 9.15. Found: N, 8.08; S, 9.23.

*Example 14*

(3 - amyloxy - 5 - hydroxy) phenylguanidine.—After unsuccessful attempts to effect the condensation of phloramine mono-amyl ether with methyl-isothiourea sulfate using absolute ethanol or water as solvents, the guanyl derivative was finally prepared by fusing the two solids: Phloramine monoamyl ether (1.0 g., 0.005 mole) and methyl-iso-thiourea sulfate (1.4 g.) were heated in an oil-bath at 155–160° for one hour with stirring. On cooling, the mixture solidified. The melt was dissolved in hot alcohol and filtered to remove the black insoluble material. The 1.5 g. of material that separated on cooling was recrystallized once from water and twice from aqueous methanol, each time with attendant treatment with charcoal. Finally the compound was recrystallized from absolute methanol to give a colorless salt which melted at 219–221°. The yield was 1.5 g. (51%).

Anal.—Calc'd. for $C_{24}H_{40}O_8N_6S$: N, 14.67; S, 5.60. Found: N, 14.54; S, 5.57.

From Example 10, other mono-ethers of phloramine will be evident and consequently it would be repetitive to set them forth specifically. Any of the mono-ethers contemplated above, such as are evident from Examples 1 to 4 inclusive, may be used in place of the mono-amyl ether of Example 10. In like manner, instead of using ammonia as in Example 10, the use of an alkyl amine will produce the corresponding N-alkyl derivative of a mono-ether phloramine.

Other examples of the production of a desired N-acyl derivative of a mono-ether phloramine will be evident from Examples 11 to 14 inclusive. Thus, it will be evident that other aliphatic or aromatic acids or their anhydrides, may, for example, be used to obtain the desired N-acyl compound.

It is therefore intended that combinations falling within the above Examples 1 to 14, and homologue and analogues thereof which have been discussed, be considered as a part of this disclosure as though specifically set forth.

What is claimed is:

Phloroglucinol derivatives having the formula:

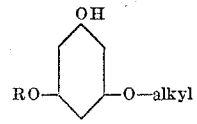

in which R is an alkyl radical containing six carbon atoms.

MAX N. HUFFMAN.

REFERENCES CITED

The following references are of record in the file of this patent:

UNITED STATES PATENTS

| Number | Name | Date |
| --- | --- | --- |
| 1,966,635 | Marx | July 17, 1934 |